(12) United States Patent
Shao et al.

(10) Patent No.: US 8,799,567 B2
(45) Date of Patent: Aug. 5, 2014

(54) METHOD FOR ACCESSING FILES IN A MANAGEMENT SYSTEM

(75) Inventors: Chih-Kuo Shao, Taipei Hsien (TW);
Yi-Chang Wu, Taipei Hsien (TW);
Sen-Ta Chan, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 1192 days.

(21) Appl. No.: 12/168,048

(22) Filed: Jul. 3, 2008

(65) Prior Publication Data
US 2009/0248613 A1 Oct. 1, 2009

(30) Foreign Application Priority Data
Mar. 25, 2008 (TW) .............................. 97110569 A

(51) Int. Cl.
*G06F 12/00* (2006.01)
*G06F 17/30* (2006.01)

(52) U.S. Cl.
CPC .............................. *G06F 17/30233* (2013.01)
USPC ....................................................... 711/112

(58) Field of Classification Search
None
See application file for complete search history.

(56) References Cited

U.S. PATENT DOCUMENTS

| 5,875,296 | A  | * | 2/1999  | Shi et al. ........................... 726/5 |
| 6,493,811 | B1 | * | 12/2002 | Blades et al. ................. 711/203 |
| 7,120,653 | B2 | * | 10/2006 | Alfieri et al. .......................... 1/1 |
| 7,689,987 | B2 | * | 3/2010  | Neil .................................. 718/1 |
| 7,945,726 | B2 | * | 5/2011  | Faibish et al. ................. 711/112 |
| 2002/0112113 | A1 | * | 8/2002  | Karpoff et al. ..................... 711/4 |
| 2002/0161971 | A1 | * | 10/2002 | Dimitri et al. ................. 711/114 |
| 2005/0015492 | A1 | * | 1/2005  | Kumbalimutt et al. ........ 709/226 |
| 2006/0117136 | A1 | * | 6/2006  | Tran et al. ..................... 711/112 |

OTHER PUBLICATIONS

NPL '02, Hard Drive Clusters and File Allocation, 2002.*
Office action mailed on Oct. 22, 2012 for the Taiwan application No. 097110569, filing date Mar. 25, 2008 p. 1-3 and p. 4 line 1-19.

* cited by examiner

*Primary Examiner* — Matthew Bradley
*Assistant Examiner* — Ramon A Mercado
(74) *Attorney, Agent, or Firm* — Winston Hsu; Scott Margo

(57) ABSTRACT

A method for accessing files in a management system, including a control device, a managed device, and a system management device, includes simulating a physical storage device of the control device to the managed device, to form a virtual storage device in the managed device, outputting a request command to the system management device via an operating system and not via a file system when the managed device accesses a file of the virtual storage device, and performing access operation of the file in the physical storage device via an operating system of the control device and not via a file system of the control device according to the request command.

5 Claims, 5 Drawing Sheets

METHOD FOR ACCESSING FILES IN A MANAGEMENT SYSTEM

BACKGROUND OF THE INVENTION

1. Field of the Invention

The present invention relates to a method for accessing files in a management system, and more particularly, to a method for avoiding occurrence of asynchronous files, preventing data from damage, and maintaining normal operations.

2. Description of the Prior Art

To provide remote management services efficiently, the prior art provides a server using a system management device, so that managers can sustain or monitor the server in a control room via Internet at anytime and anyplace. Generally, the system management device usually provides functions such as KVM-over-IP, virtual storage (or named drive redirection and virtual media), and so on.

As for KVM-over-IP, KVM is an abbreviation of prefixes of Keyboard, Video, and Mouse, and means controlling 2~4032 computers with a set of a keyboard, monitor, and mouse. KVM is operated directly by the managers. If the managers cannot get KVM, the managers will fail to solve problems of the server or configure the server immediately. KVM-over-IP is a new solution, which transmits KVM signals to a terminal-to-be-managed via Internet without limitation of distances, time, and personal factors, so that the managers can manage, control, and monitor the terminal-to-be-managed via Internet at anytime and anyplace to keep an eye on all situations and handle problems immediately.

As for the virtual storage, the concept of the virtual storage is similar to the KVM-over-IP. Please refer to FIG. 1. In FIG. 1, a system management device 104 simulates a virtual storage device 108, such as a floppy disk drive, a hard disk drive, or a CD-ROM drive, in a managed device 102 via a system management chip 110, and transmits data of a physical storage device 106 of a control device 100 to the managed device 102 via Internet. The managed device 102 regards the virtual storage device 108 as a physical storage device, and data of the virtual storage device 108 is the same as that of the physical storage device 106. In other words, the managed device 102 seems owning a storage device the same as the physical storage device 106, so that the managed device 102 can exchange data with the control device 100 without an Internet driver program. Correspondingly, the control device 100 includes a management program 112 for connecting with the system management device 104 via a network interface card 114, to load the physical storage device 106 into the managed device 102 or erase the physical storage device 106 from the managed device 102. As for operations of the system management device 104, please refer to the following description.

First, application programs access data of a disk by means of accessing files, and an operating system provides file access services in a hierarchical structure, which identifies locations of the files in the disk via a file system, and access data of the disk via a driver program. The operating system stores related data of the file system in a memory when booting, and writes data into the disk if updated. Therefore, if there is data written into the disk not via the file system of the operating system, the file system cannot recognize that files have been updated.

Please refer to FIG. 2 and FIG. 3. FIG. 2 is a schematic diagram when the managed device 102 shown in FIG. 1 reads a file from the virtual storage device 108, while FIG. 3 is a schematic diagram when the managed device 102 shown in FIG. 1 writes a file into the virtual storage device 108. In FIG. 2, when an application program of the managed device 102 reads a file of the virtual storage device 108, the application program outputs a request command to the system management device 104 through a route a1. That is, the application program reads the file of the virtual storage device 108 via a system call function of the operating system, and the operating system gains locations of the virtual storage device 108 corresponding to the file via the file system, so as to read the file from the virtual storage device 108 via a driver program. Next, the system management device 104 transmits the request command via Internet to the management program 112 of the control device 100 through a route a2. Then, the management program 112 reads the file from the physical storage device 106 through a route a3, and transmits the file back to the system management device 104 via Internet (namely, through the route a2), so as to accomplish the reading operation.

On the other hand, in FIG. 3, when the managed device 102 writes a file into the virtual storage device 108, the application program outputs a request command to the system management device 104 through a route b1. That is, the application program writes the file into the virtual storage device 108 via a system call function of the operating system, and the operating system will determine where to write the file into the virtual storage device 108 via the file system, so as to write the file into the virtual storage device 108 via a driver program. Next, the system management device 104 transmits the request command and the file-to-be-written via Internet to the management program 112 of the control device 100 through a route b2. Since the request command to write a file is a lower level instruction, information of the request command does not make the system management device 104 or the management program 112 to write the file into the physical storage device 106 via the file system of the operating system. Therefore, when the management program 112 receives the request command and the file-to-be-written, the management program 112 writes the file into the physical storage device 106 through a route b3 but not via the file system of the operating system. In other words, when the managed device 102 writes the file into the virtual storage device 108, the file system of the control device 100 can not recognize update of files of the physical storage device 106, causing problems of asynchronous files between the control device 100 and the managed device 102. In such a case, when other application programs of the control device 100 access the file of the physical storage device 106 through a route b4, data damage may happen, causing serious system errors.

Thus, to avoid the above-mentioned problems, the prior art usually restrains users of the control device 100 from accessing files of the physical storage device 106. In other words, the control device 100 and the managed device 102 cannot access the files of the physical storage device 106 bi-directionally, so that the application range is limited.

SUMMARY OF THE INVENTION

It is therefore a primary objective of the claimed invention to provide a method for accessing files in a management system.

The present invention discloses a method for accessing files in a management system. The management system comprises a control device, a managed device, and a system management device between the control device and the managed device. The method for accessing files comprises simulating a physical storage device of the control device to the managed device via the system management device, so as to form a virtual storage device in the managed device, outputting a request command to the system management device via a first operating system of the managed device and not via a first file system of the managed device when the managed device accesses a file of the virtual storage device, and performing an access operation on the file in the physical storage device by the control device via a second operating system of the control device and not via a second file system of the control device according to the request command.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
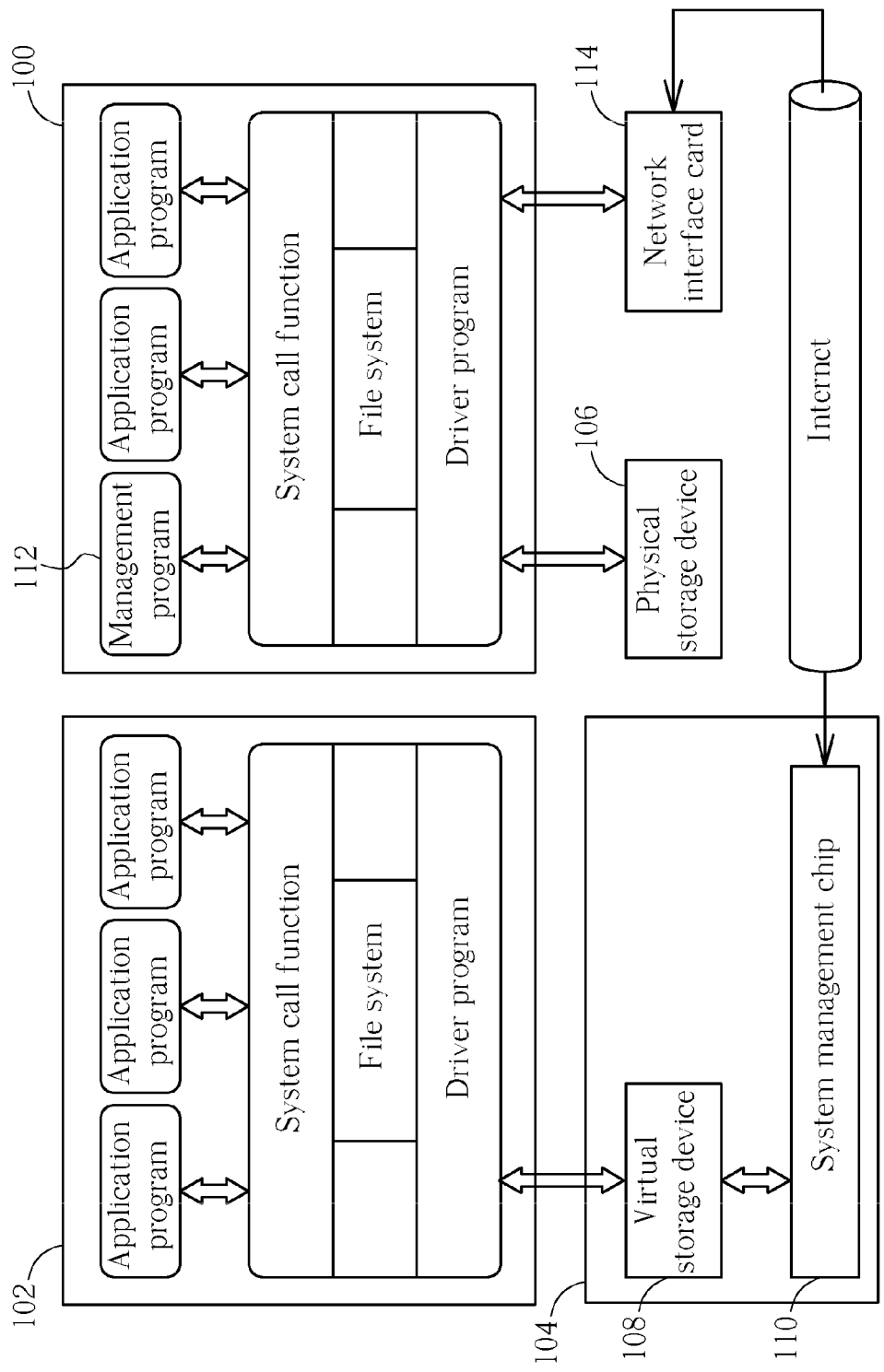
FIG. 1 is a schematic diagram of a system management device, a managed device, and a control device in the prior art.
Figure 2:
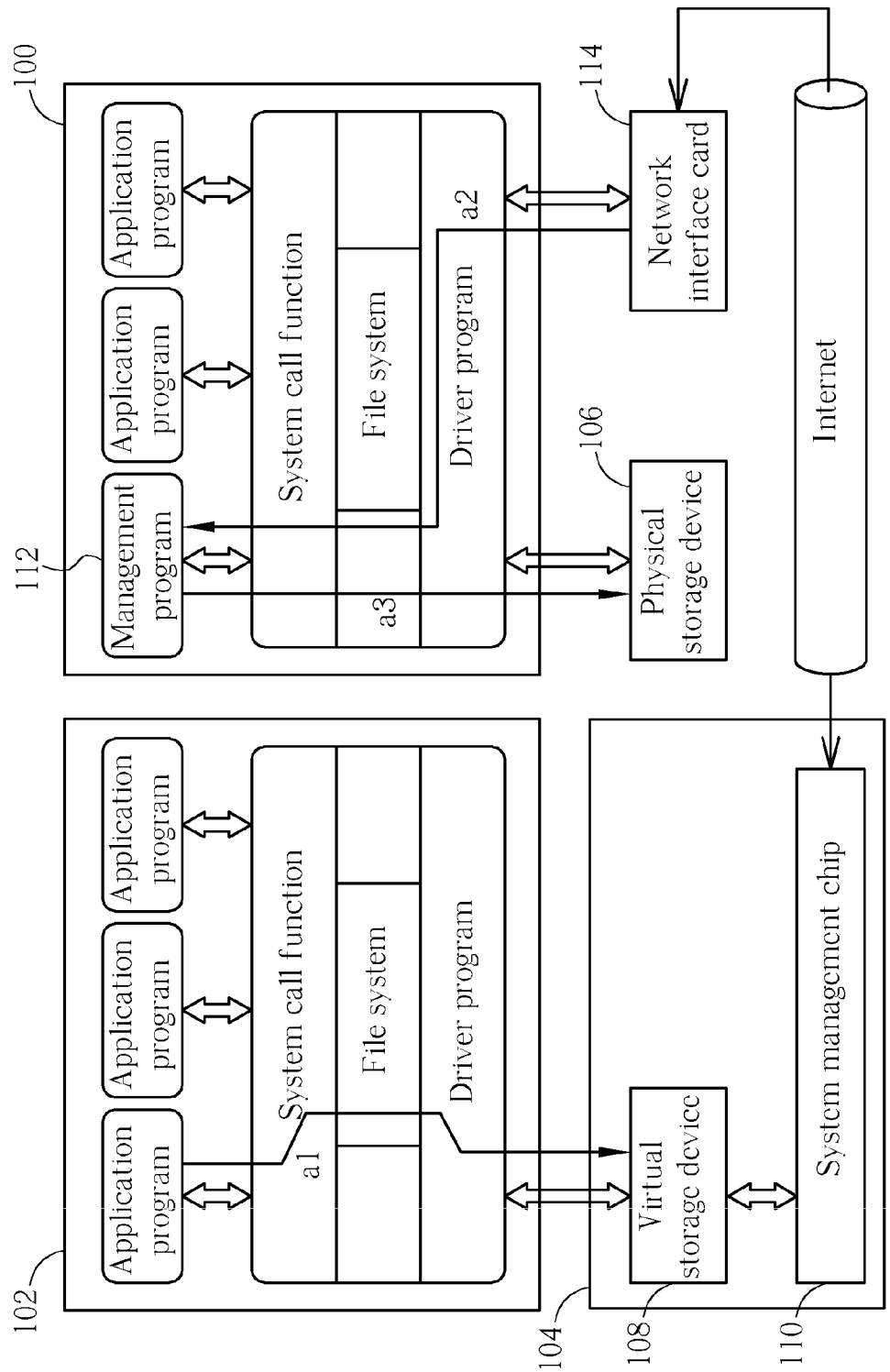
FIG. 2 is a schematic diagram when the managed device shown in FIG. 1 reads a file from the virtual storage device.
Figure 3:
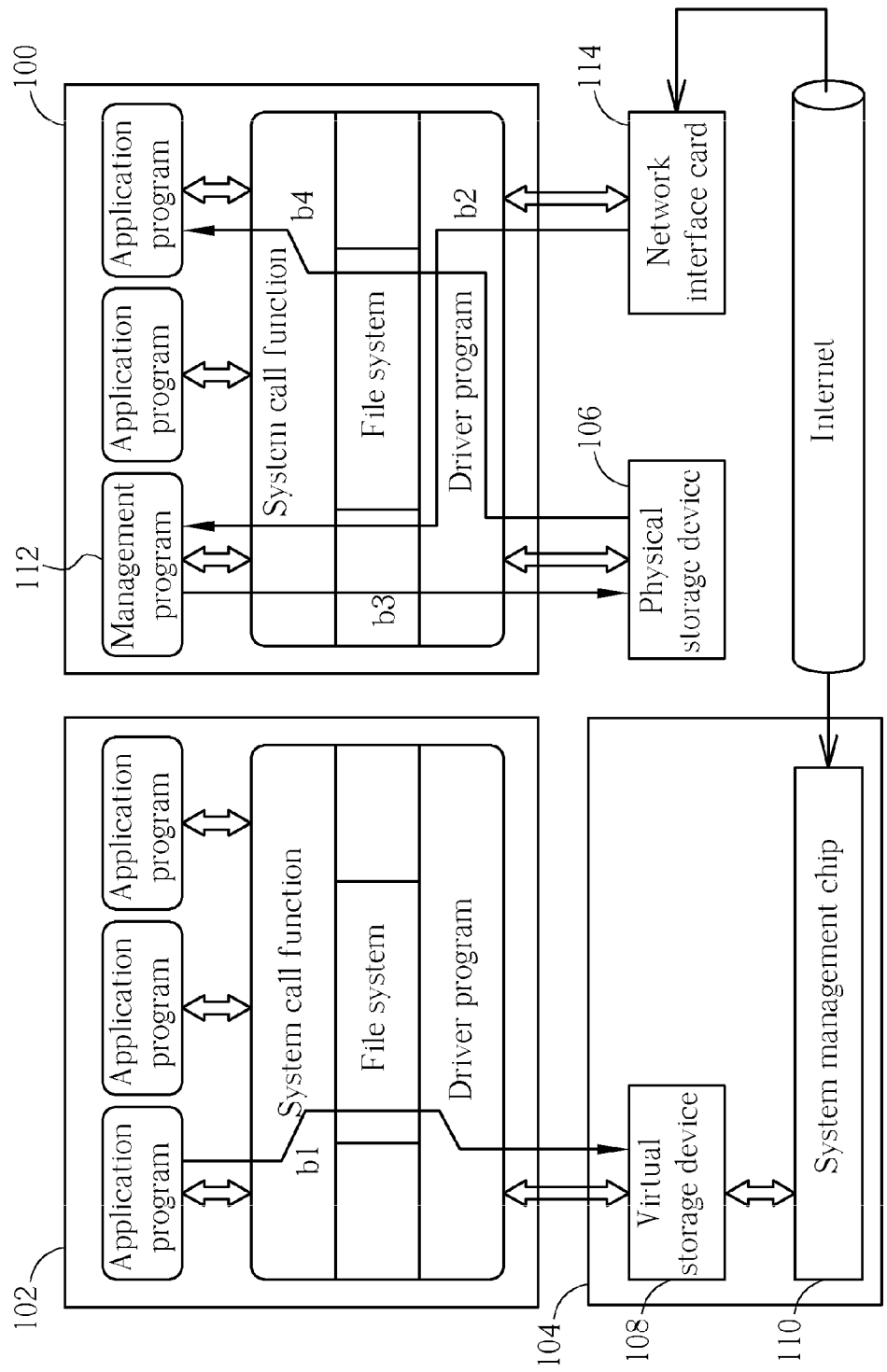
FIG. 3 is a schematic diagram when the managed device shown in FIG. 1 writes a file into the virtual storage device.
Figure 4:
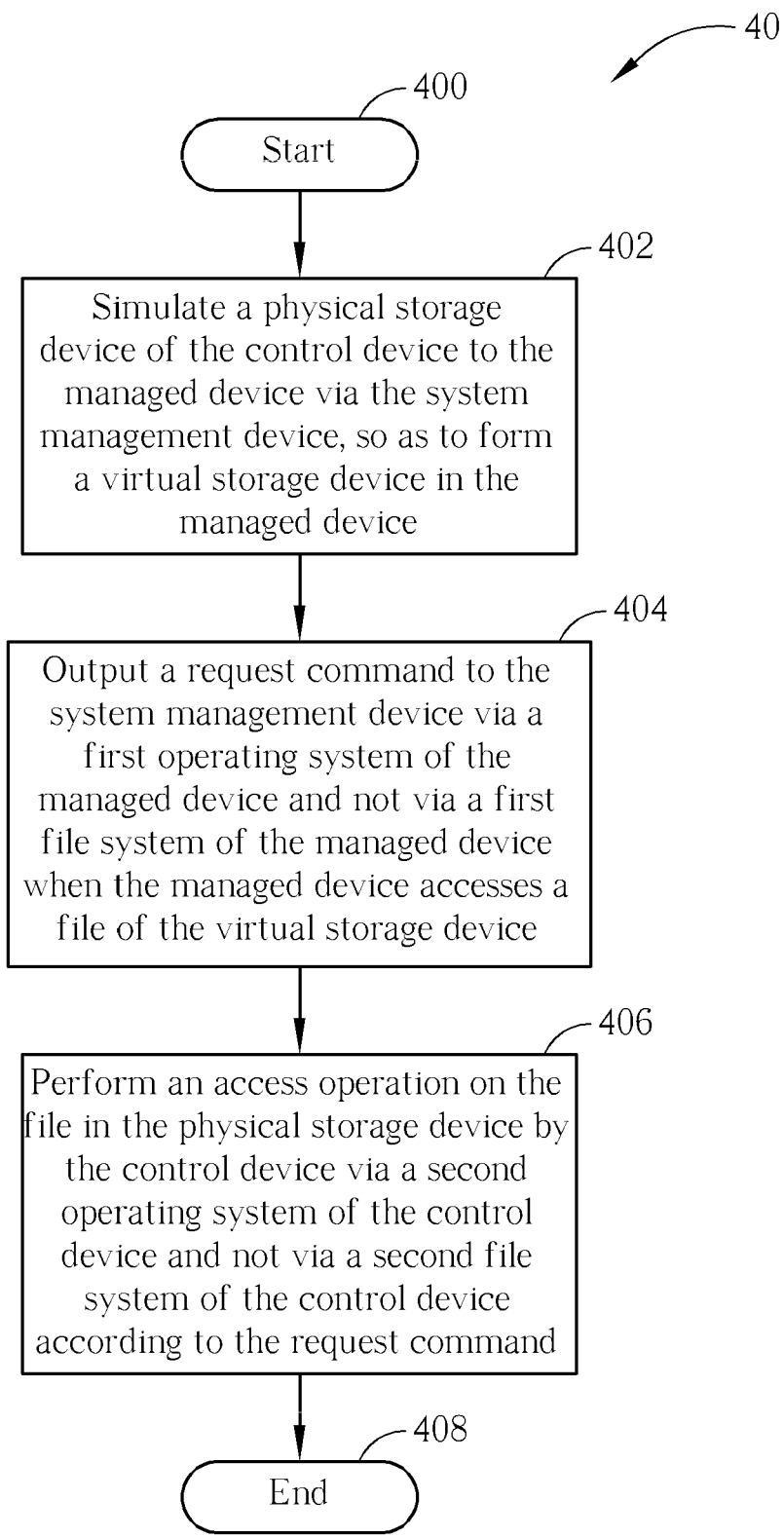
FIG. 4 is a schematic diagram of a procedure according to an embodiment of the present invention.

Please refer to FIG. 4, which is a schematic diagram of a procedure 40 according to an embodiment of the present invention. The procedure 40 is utilized for accessing files in a management system, which preferably has the same structure shown in FIG. 1, so that detail descriptions of elements of the management system is omitted hereinafter. The procedure 40 comprises the following steps:

Step 400: Start.

Step 402: Simulate a physical storage device of the control device to the managed device via the system management device, so as to form a virtual storage device in the managed device.

Step 404: Output a request command to the system management device via a first operating system of the managed device and not via a first file system of the managed device when the managed device accesses a file of the virtual storage device.

Step 406: Perform an access operation on the file in the physical storage device by the control device via a second operating system of the control device and not via a second file system of the control device according to the request command.

Step 408: End.

According to the procedure 40, after the system management device forms a virtual storage device in the managed device, if the managed device accesses a file of the virtual storage device, the present invention outputs a request command to the system management device via the operating system of the managed device and not via the file system of the managed device. In other words, when an application program of the managed device needs to access the file of the virtual storage device, the present invention directly outputs the request command to the system management device without using the file system. Accordingly, the control device performs the access operation on the file in the physical storage device via the operating system and not via the file system.

Figure 5:
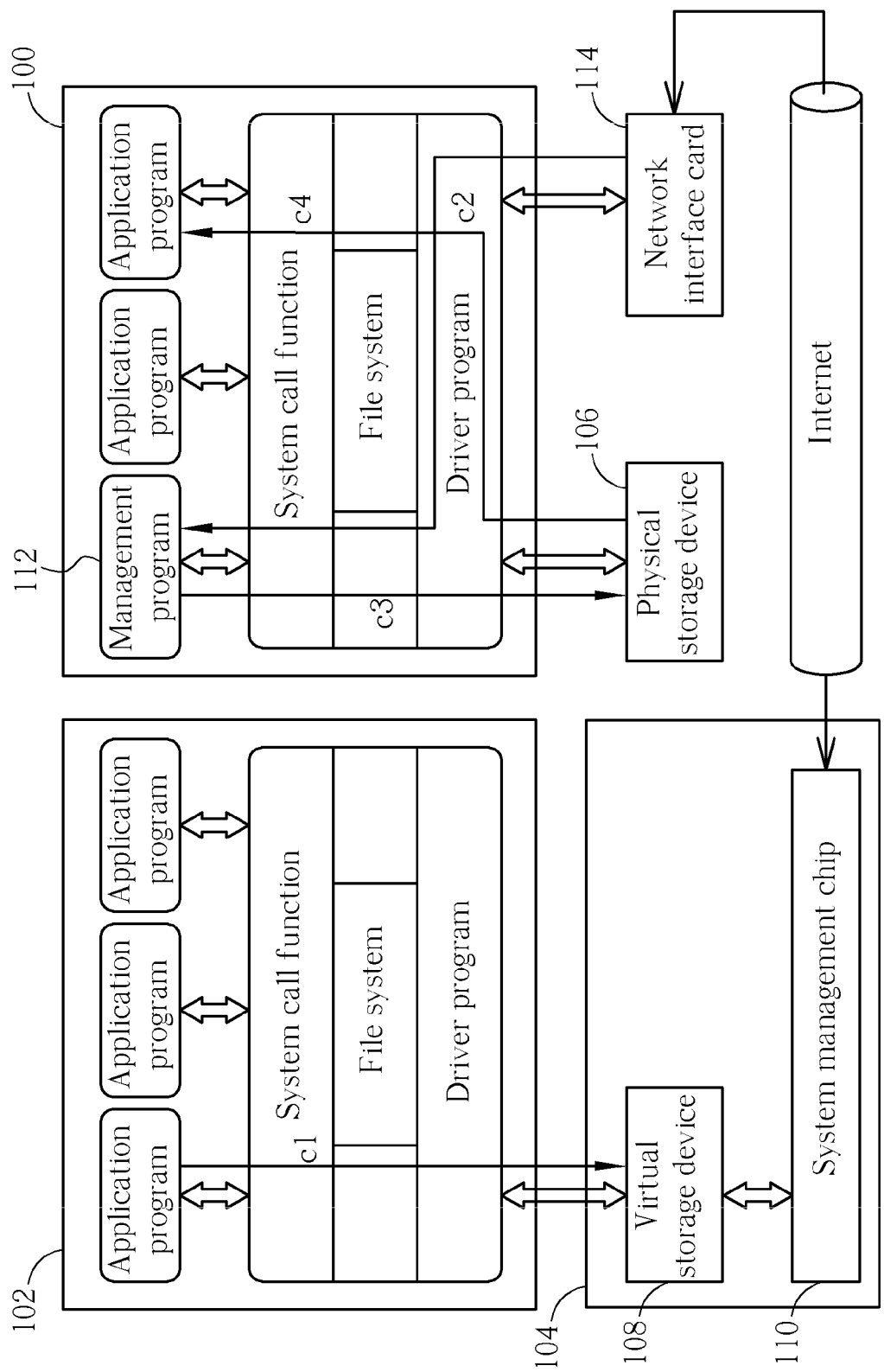
FIG. 5 is a schematic diagram of loading a file into a virtual storage device via the managed device shown in FIG. 1 according to the procedure shown in FIG. 4.

In such a situation, when an application program of the control device performs an access operation on a file in the physical storage device, the application program directly accesses the file in the physical storage device via the operating system and not via the file system. For example, please refer to FIG. 5. FIG. 5 is a schematic diagram of writing a file into the virtual storage device 108 via the managed device 102 shown in FIG. 1 according to the procedure 40. As shown in FIG. 5, when the managed device 102 writes the file into the virtual storage device 108, the application program outputs a request command to the system management device 104 through a route c1. Namely, the application program does not use the file system but activate a system call function and a driver program of the operating system to write the file into the virtual storage device 108. Then, through a route c2, the system management device 104 transmits the request command and the file-to-be-written to a management program 112 of the control device 100 via Internet. When the management program 112 receives the request command and the file-to-be-written, the management program 112 writes the file into the physical storage device 106 via a route c3 but not via the file system of the operating system. At the same time, if other application programs of the control device 100 access files in the physical storage device 106, the application programs will access files in the physical storage device 106 through a route c4. That is, the application programs access files via the operating system and not via the file system.

In short, via the present invention, accessing operations of the control device 100 and the managed device 102 are not performed via the file system, thereby avoiding problems of asynchronous files, preventing data from damage, and maintaining normal operations.

In conclusion, when the control device or the managed device accesses files, the present invention performs the access operation via the operating system and not via the file system, so as to avoid occurrence of asynchronous files, prevent data from damage, and maintain normal operations.

Those skilled in the art will readily observe that numerous modifications and alterations of the device and method may be made while retaining the teachings of the invention.

What is claimed is:

1. A method for accessing files in a management system comprising a control device, a managed device, and a system management device between the control device and the managed device, the managed device comprising: a first operating system and a first file system, the control device comprising a second operating system and a second file system, the method comprising:

simulating a physical storage device of the control device to the managed device via the system management device, so as to form a virtual storage device having the same data as the physical storage device in the managed device;

outputting a request command to the system management device by the managed device via the first operating system of the managed device and not via the first file system of the managed device when the managed device accesses a file of the virtual storage device; and performing an access operation on the file in the physical storage device by the control device via a second operating system of the control device and not via second file system of the control device according to the request command.

2. The method of claim 1, wherein the file is stored in continuous sectors of the physical storage device in the control device.

3. The method of claim 1, wherein performing the access operation on the file in the physical storage device by the control device via the second operating system of the control device and not via the second file system of the control device according to the request command comprises:
- reading the file in the physical storage device by the control device via the second operating system of the control device and not via the second file system of the control device when the request command indicates to read the file; and
- outputting the file to the managed device by the system management device.

4. The method of claim 1, wherein performing the access operation on the file in the physical storage device by the control device via the second operating system of the control device and not via the second file system of the control device according to the request command comprises:
- loading the file into the physical storage device by the control device via the second operating system of the control device and not via the second file system of the control device when the request command indicates to load the file.

5. The method of claim 1 further comprising:
- performing the access operation on a first file in the physical storage device via the second operating system of the control device and not via the second file system of the control device when an application program of the control device performs an access operation on the first file.

\* \* \* \* \*